United States Patent
Beck et al.

(10) Patent No.: US 9,033,846 B2
(45) Date of Patent: May 19, 2015

(54) MULTI-SPEED PLANETARY VEHICLE TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/379,807

(22) PCT Filed: Jan. 10, 2013

(86) PCT No.: PCT/EP2013/050356
§ 371 (c)(1),
(2) Date: Aug. 20, 2014

(87) PCT Pub. No.: WO2013/127547
PCT Pub. Date: Sep. 6, 2013

(65) Prior Publication Data
US 2015/0018166 A1    Jan. 15, 2015

(30) Foreign Application Priority Data
Feb. 29, 2012   (DE) .......................... 10 2012 203 068

(51) Int. Cl.
*F16H 3/62* (2006.01)
*F16H 3/66* (2006.01)

(52) U.S. Cl.
CPC .................. *F16H 3/62* (2013.01); *F16H 3/666* (2013.01); *F16H 2200/0065* (2013.01); *F16H 2200/2012* (2013.01); *F16H 2200/2046* (2013.01)

(58) Field of Classification Search
CPC .............. F16H 3/62; F16H 2200/0065; F16H 2200/2012; F16H 2200/2046
See application file for complete search history.

(56) References Cited

U.S. PATENT DOCUMENTS

| 7,771,305 B1 | 8/2010 | Hart et al. |
| 7,887,453 B2 | 2/2011 | Phillips et al. |

(Continued)

FOREIGN PATENT DOCUMENTS

| DE | 10 2007 055 808 A1 | 6/2009 | |
| DE | 10 2009 019 046 A1 | 11/2010 | |
| DE | 10 2009 047 277 A1 | 6/2011 | |
| DE | 102009047277 A1 * | 6/2011 | ............... F16H 3/66 |
| JP | 2009-197927 A | 9/2009 | |

OTHER PUBLICATIONS

German Search Report Corresponding to 10 2012 203 068.9 mailed Nov. 13, 2012 6 pages.

(Continued)

*Primary Examiner* — Huan Le
(74) *Attorney, Agent, or Firm* — Davis & Bujold, P.L.L.C.; Michael J. Bujold

(57) ABSTRACT

A multi-gear planetary transmission for a vehicle having four planetary gearsets (RS1, RS2, RS3, RS4), a plurality of shafts (I, II III, IV, V, VI, VII VIII, IX) and six shifting elements (A, B, C, D, E, F) which can be actuated to obtain a plurality of gears. At least the fourth planetary gearset (RS4) is a plus planetary gearset, the first shaft (I) is the drive input (An) which is connected to the planetary carrier (PT1) of the first planetary gearset (RS1) and to the third shifting element (C). The second shaft (II) is the drive output (Ab) which is connected at least to the ring gear (HO4) of the fourth planetary gearset (RS4). For each gear, at least four of the shifting elements (A, B, C, D, E, F) are engaged.

14 Claims, 4 Drawing Sheets

(56) References Cited

U.S. PATENT DOCUMENTS

| | | |
|---|---|---|
| 8,663,055 B2 | 3/2014 | Brehmer et al. |
| 2009/0118062 A1 | 5/2009 | Phillips et al. |
| 2009/0209389 A1 | 8/2009 | Phillips et al. |

OTHER PUBLICATIONS

German Search Report Corresponding to 10 2012 203 069.7 mailed Nov. 13, 2012 6 pages.
German Search Report Corresponding to 10 2012 203 104.9 mailed Nov. 13, 2012 6 pages.
International Search Report Corresponding to PCT/EP2013/050356 mailed Mar. 18, 2013 5 pages.
International Search Report Corresponding to PCT/EP2013/050357 mailed Mar. 18, 2013 5 pages.
International Search Report Corresponding to PCT/EP2013/050361 mailed Mar. 18, 2013 5 pages.
Written Opinion Corresponding to PCT/EP2013/050356 mailed Mar. 18, 2013 10 pages.

\* cited by examiner

| GEAR | ENGAGED SHIFT ELEMENTS | | | | | | TRANS. RATIO | GEAR STEP |
|---|---|---|---|---|---|---|---|---|
| | BRAKE | | CLUTCH | | | | | |
| | A | B | C | D | E | F | i | φ |
| 1 | × | × | × | | | × | 4.583 | 1.585 |
| 2 | × | × | | | × | × | 2.891 | 1.577 |
| 3 | | × | × | | × | × | 1.833 | 1.212 |
| 4 | | × | | × | × | × | 1.513 | 1.230 |
| 5 | | × | × | × | | × | 1.230 | 1.230 |
| 6 | | | × | × | × | × | 1.000 | 1.229 |
| 7 | × | | × | × | | × | 0.814 | 1.290 |
| 8 | × | | | × | × | × | 0.631 | 1.236 |
| 9 | × | | × | × | × | | 0.510 | TOTAL 8.983 |
| R | × | × | | × | | × | -2.898 | |
| M | | | × | × | × | × | 1.513 | |
| M | × | × | | × | × | | 1.513 | |
| M | × | × | × | | × | | 4.583 | |
| M | × | × | × | × | | | 4.583 | |

Fig. 2

MULTI-SPEED PLANETARY VEHICLE TRANSMISSION

This application is a National Stage completion of PCT/EP20131050356 filed Jan. 10, 2013, which claims priority from German patent application serial no. 10 2012 203 068.9 filed Feb. 29, 2012.

FIELD OF THE INVENTION

The present invention concerns a multi-gear planetary transmission for a Vehicle.

BACKGROUND OF THE INVENTION

For example from the document DE 10 2007 055 808 A1 an automatic transmission of planetary design is known, which comprises four planetary gearsets and six shifting elements as well as eight rotating shafts. All the planetary gearsets are in the form of minus planetary gearsets. With the total of six shifting elements ten forward gears and two reverse gears can be engaged selectively. However, from the shifting scheme of the known automatic transmission it can be seen that to produce each gear step, in each case only three of the shifting elements provided are closed. Because of the disk shifting elements that remain open, there are therefore undesirably high drag losses.

SUMMARY OF THE INVENTION

The purpose of the present invention is to propose a planetary transmission of the type described to begin with, which is structurally simple, which can be produced as compactly and inexpensively as possible and in which drag losses are also lower.

According to the invention this objective is achieved by the characteristics described below.

A multi-gear planetary transmission is proposed, for example an automatic or automated transmission for a vehicle, which comprises four planetary gearsets or planetary gearset planes and six shifting elements for producing a plurality of gear steps. In this case at least one of the planetary gearsets is designed as a plus planetary gearset, while a shaft constituting the drive input shaft connects the planetary carrier of the first planetary gearset to a third shifting element and a shaft constituting the drive output shaft is coupled at least to the plus planetary gearset, in that the second shaft is connected to the ring gear of the plus planetary gearset, in such manner that in each gear at least four of the six shifting elements are actuated or closed.

In this way, drag losses in the planetary transmission according to the invention are minimized because of the small number of open shifting elements in the engaged condition. It is possible for one or more minus planetary gearsets to be changed to further plus planetary gearsets if at the same time the web or planetary gearwheel carrier connection and the ring gear connection are exchanged and the value of the fixed transmission ratio of the planetary gearset concerned is increased by 1 and provided that the connections of the elements of the planetary gearset so permit. As is known, a minus planetary gearset has planetary gearwheels mounted to rotate on the planetary carrier, which mesh with the sun gear and with the ring gear of the planetary gearset so that when the planetary carrier is fixed and the sun gear is rotating, the ring gear rotates in the opposite direction to the rotational direction of the sun gear. As is also known a plus planetary gearset has, mounted to rotate on its planetary carrier, inner and outer gearwheels which mesh with one another, the sun gear of the planetary gearset meshing with the inner planetary gearwheels and the ring gear of the planetary gearset meshing with the outer planetary gearwheels, so that when the planetary carrier is fixed and the sun gear is rotating, the ring gear rotates in the same direction as the sun gear.

Preferably, in the proposed planetary transmission the drive input shaft and the drive output shaft can be arranged coaxially so as to produce a standard drive input in a vehicle. However, it is also possible to produce a front transverse configuration with the planetary transmission in a vehicle, if the geometrical arrangement and hence the sequence of the elements of the planetary transmission, as for example the arrangement of the individual planetary gearsets and shifting elements is changed, provided that the connections of the transmission elements allow this, in such manner that then, for example, the drive input shaft and the drive output shaft are arranged offset relative to one another.

With the planetary transmission according to the invention a hydrodynamic torque converter or a hydrodynamic clutch can be used as the starting element. It is also conceivable to use an additional starting clutch or an integrated starting clutch or starting brake. Furthermore, additional electric machines can be used. For example, an electric machine or some other source of force and power can be arranged on at least one of the shafts. It is also conceivable to arrange on at least one shaft a freewheel to the housing or else to another shaft. As shifting elements both frictional and interlocking shifting elements can be considered. Preferably, the second shifting element in the form of a brake and the sixth shifting element in the form of a clutch can each be made as claw shifting elements.

In the planetary transmission according to the invention, at least one of the planetary gearsets, for example the third planetary gearset, can be internally locked if two elements of the third planetary gearset are connected by an associated shifting element, for example the fifth shifting element. Thus, the various possible arrangements of the shifting elements provide various locking variants. For example, the ring gear of the third planetary gearset can be connected by way of a fifth shaft and by way of the fifth shifting element to the sun gear in order to lock the planetary gearset. Moreover, the planetary gearwheel carrier of the third planetary gearset can be connected by way of the fifth shifting element and the seventh shaft to the sun gear thereof in order to lock the planetary gearset. Furthermore, the planetary carrier of the third planetary gearset can be connected to the ring gear thereof by way of the eighth shaft, the fifth shifting element and the fifth shaft, with the same locking effect.

In a related further development of the invention, in the planetary transmission proposed it is also possible to implement various functionally equivalent arrangement variations related to a shifting element associated with the third planetary gearset, for example the fourth shifting element which is in the form of a clutch. For one thing, the fourth shifting element can be positioned on the web or planetary carrier of the third planetary gearset. The fourth shifting element can also be arranged on the ring gear or even on the sun gear of the third planetary gearset. From the resulting, functionally equivalent alternatives, various design arrangements of the gearset of the planetary transmission according to the invention can be produced, for example in order to enable adaptation of the planetary transmission to a predetermined fitting space.

BRIEF DESCRIPTION OF THE DRAWINGS

Below, the present invention is explained in more detail with reference to the drawings, which show:

FIG. 2: A shifting scheme for the planetary transmission according to the invention;

DETAILED DESCRIPTION OF THE PREFERRED EMBODIMENTS

The figures represent various embodiment variants of the planetary transmission according to the invention, used for example as an automatic or automated transmission for a vehicle.

Regardless of the particular embodiment variant, the planetary transmission comprises four planetary gearsets RS1, RS2 RS3, RS4 and six shifting elements A, B, C, D, E, F as well as nine shafts I, II, III, IV, V, VI, VII, VIII, IX, wherein the term 'shaft' is understood to mean one or more components of any structural form which connect or couple at least two elements of the planetary transmission. In the planetary transmission according to the invention the required housing couplings are produced by means of shifting elements in the form of brakes, so there are no fixed housing couplings.

The planetary gearsets used are minus planetary gearsets and plus planetary gearsets, and in the embodiment variants shown the first three planetary gearsets RS1, RS2, RS3 are each minus planetary gearsets and the fourth planetary gearset RS4 is a plus planetary gearset.

Regardless of the particular embodiment variant, the first shifting element A and the second shifting element B are brakes, in order to produce shiftable housing couplings. The third shifting element C, the fourth shifting element D, the fifth shifting element E and the sixth shifting element F are in each case clutches.

Figure 1:
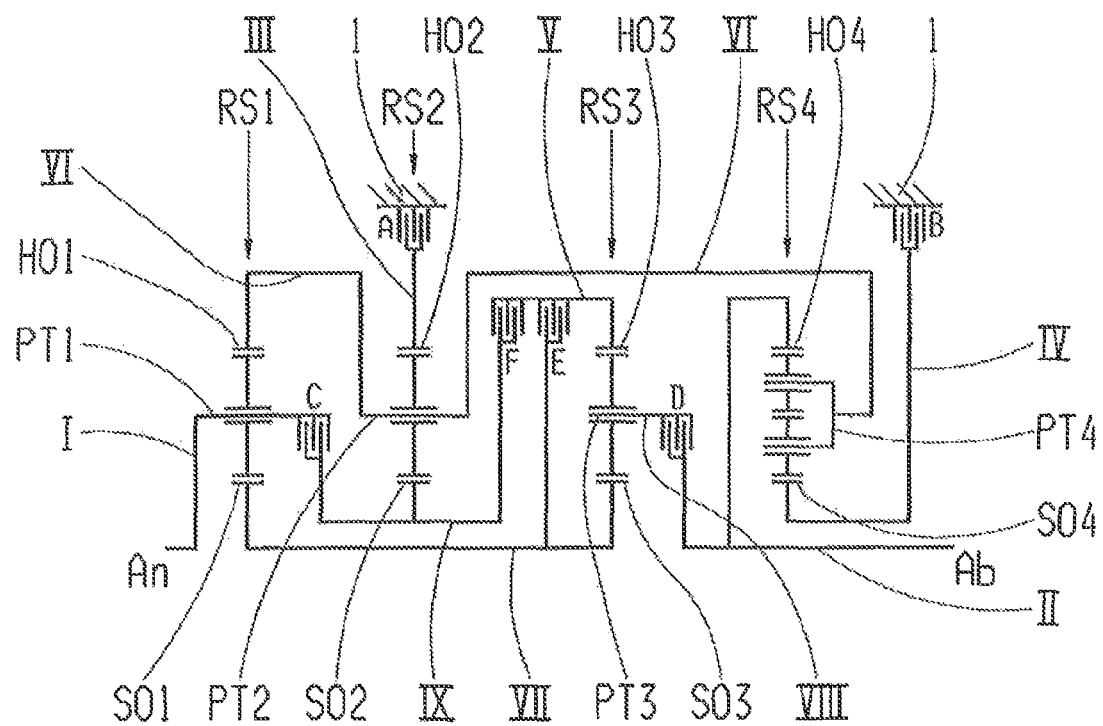
FIG. 1: A schematic view of a first embodiment variant of a planetary transmission according to the invention.

In the first embodiment variant of the planetary transmission according to the invention shown in FIG. 1 the first shaft I, which is the drive input shaft An of the transmission, is connected to the planetary carrier PT1 of the first planetary gearset RS1 and to a third shifting element C in the form of a disk clutch. The second shaft II, which is the drive output shaft Ab of the transmission, is connected to a ring gear HO4 of the fourth planetary gearset RS4 and to a fourth shifting element D also in the form of a disk clutch. To form the first shiftable housing coupling a third shaft III is provided, by which the ring gear HO2 of the second planetary gearset RS2 is connected to the first shifting element A in the form of a disk brake, so that when the first shifting element A is closed the ring gear HO2 is connected to the housing G. A fourth shaft IV forms the second shiftable housing coupling, in which the sun gear SO4 of the fourth planetary gearset RS4 is connected by the fourth shaft IV to the second shifting element B in the form of a disk brake so that when the shifting element B is closed the sun gear SO4 is connected to the housing. A fifth shaft V connects the ring gear HO3 of the third planetary gearset RS3 both to the fifth shifting element E and also to the sixth shifting element F, each of them in the form of disk clutches. A sixth shaft VI connects the ring gear HO1 of the first planetary gearset RS to the planetary carrier PT2 of the second planetary gearset RS2 and to the planetary carrier PT4 of the fourth planetary gearset RS4, so that the planetary carrier PT4 of the fourth planetary gearset RS4 forms the mounting both for the inner planetary gearwheels PRI4 which mesh with the sun gear SO4 and also for the outer planetary gearwheels PRA4. The outer planetary gearwheels PRA4 mesh both with the inner planetary gearwheels PRI4 and with the ring gear HO4. A seventh shaft VII connects the sun gear SO1 of the first planetary gearset RS1 to the fifth shifting element E and to the sun gear SO3 of the third planetary gearset RS3. By means of an eighth shaft VIII a connection is formed between the fourth shifting element D and the planetary carrier PT3 of the third planetary gearset RS3. A ninth shaft IX connects the third shifting element C to the sun gear SO2 of the second planetary gearset RS2 and to the sixth shifting element F.

Figure 3:
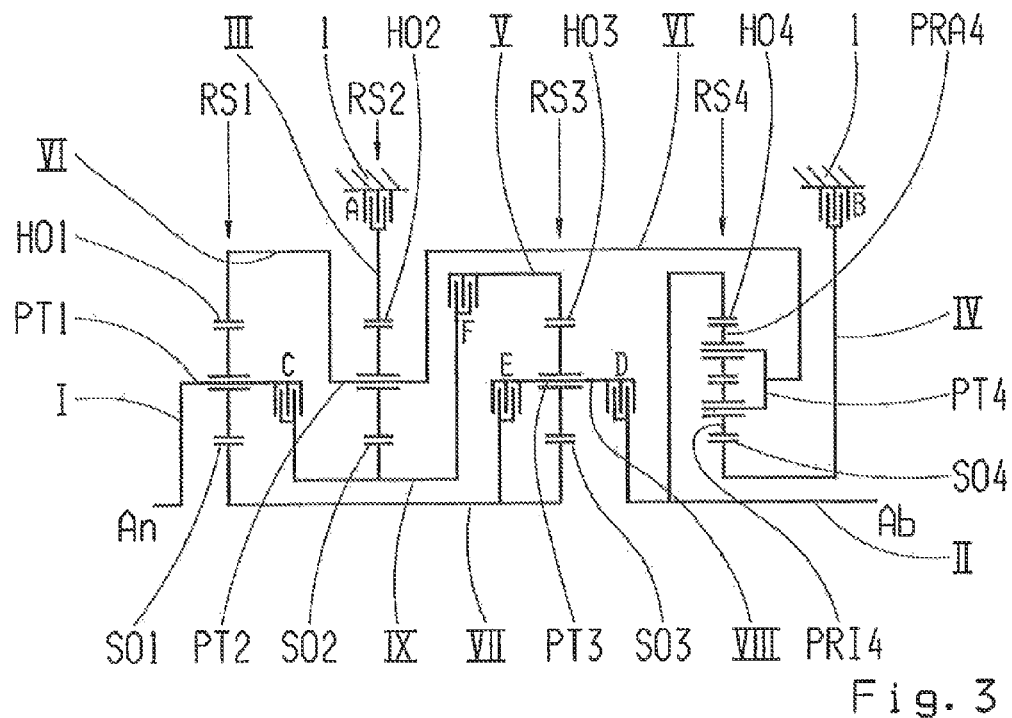
FIG. 3: A schematic view of a second embodiment variant of the planetary transmission according to the invention, with a variant for locking the third planetary gearset.

Starting from this first embodiment variant according to FIG. 1, FIG. 3 shows a second embodiment variant in which an alternative option for locking the third planetary gearset RS3 is illustrated. In this second embodiment variant, by contrast with the first embodiment variant the locking is effected in that the planetary carrier PT3 can be connected by way of the fifth shifting element E and by way of the seventh shaft VII to the sun gear SO3 of the third planetary gearset RS3.

Figure 4:
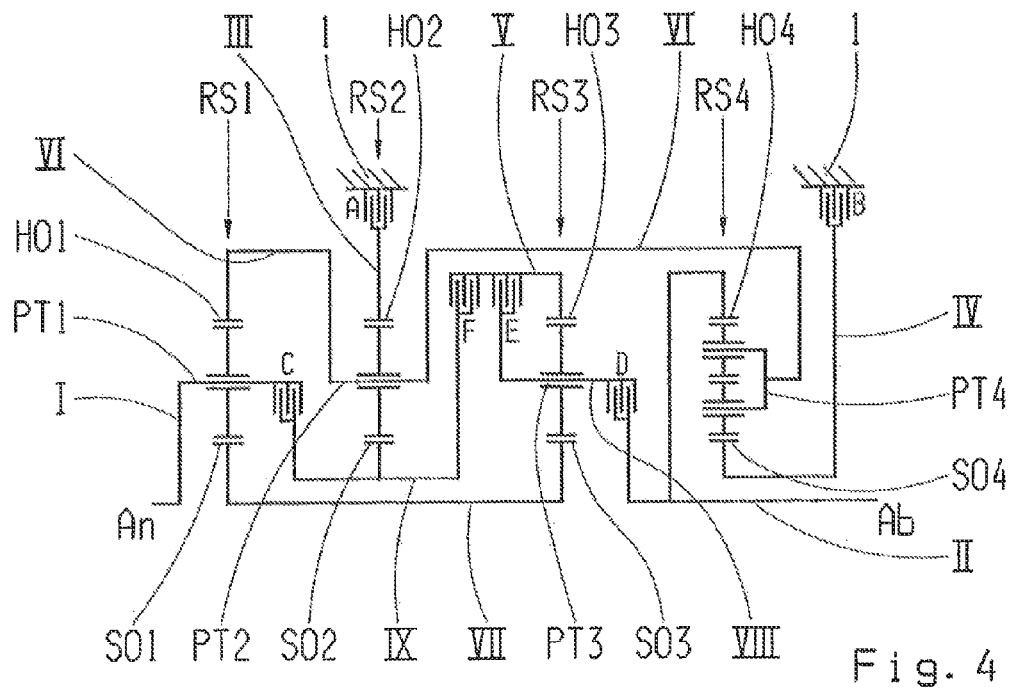
FIG. 4: A schematic view of a third embodiment variant of the planetary transmission according to the invention, with a further variant for locking the third planetary gearset.

FIG. 4 shows a third embodiment variant of the planetary transmission according to the invention, in which another locking variant of the third planetary gearset RS3 is illustrated. In this third embodiment variant, by contrast with the first and second embodiment variants, the locking is effected in that the planetary carrier PT3 can be connected to the ring gear HO3 of the third planetary gearset RS3 by way of the eighth shaft VIII and by way of the fifth shifting element E as well as by the fifth shaft V.

Figure 5:
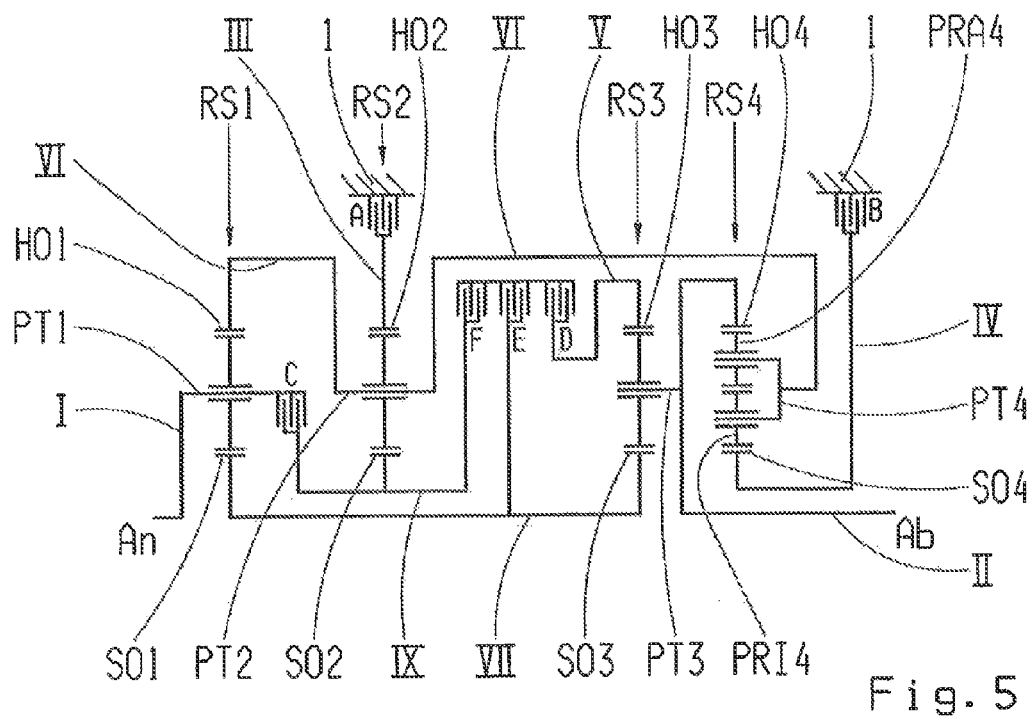
FIG. 5: A schematic view of a fourth embodiment variant of the planetary transmission according to the invention, with a different arrangement of shifting elements.
Figure 6:
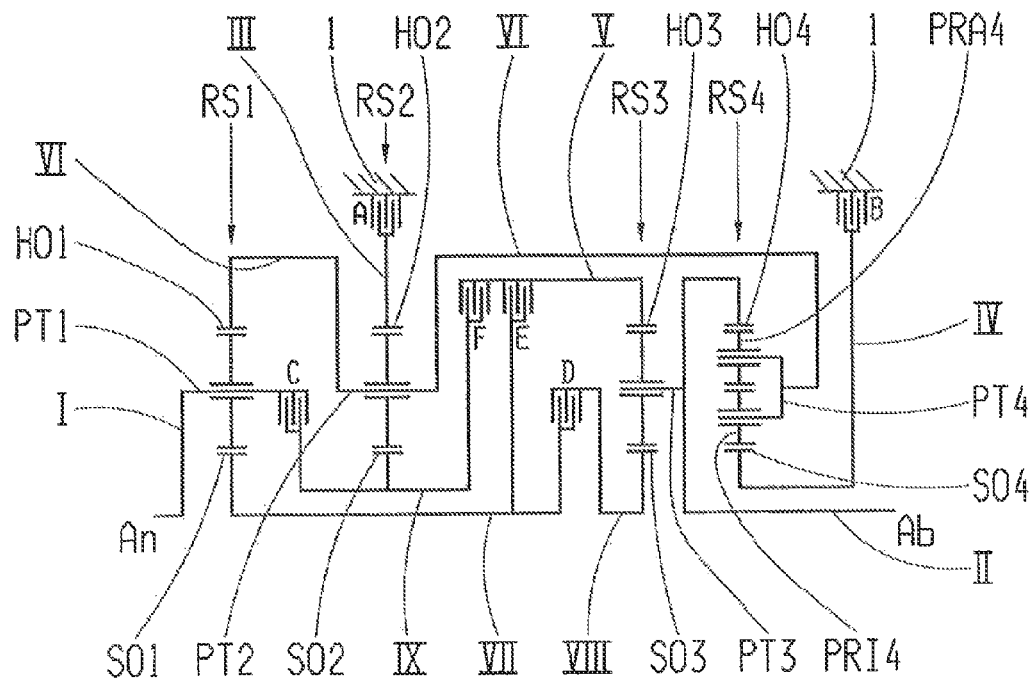
FIG. 6: A schematic view of a fifth embodiment variant of the planetary transmission according to the invention, with another different arrangement of shifting elements.

FIGS. 5 and 6 show fourth and fifth embodiment variants of the planetary transmission according to the invention in which, compared with the first embodiment variant, different arrangements of the fourth shifting element D are shown. These embodiment variants are functionally equivalent to the first embodiment variant.

To be specific, in the fourth embodiment variant according to FIG. 5 the first shaft I, which is the drive input shaft An, is connected to the planetary carrier PT1 of the first planetary gearset RS1 and to the third shifting element C, whereas the second shaft II, which is the drive output shaft Ab, is connected to the planetary carrier PT3 of the third planetary gearset RS3 and to the ring gear HO4 of the fourth planetary gearset RS4. The ring gear HO2 of the second planetary gearset RS2 can be connected fixed to the housing by the third shaft III and by way of the first shifting element A. The fourth shaft IV can connect the sun gear SO4 of the fourth planetary gearset RS4 fixed to the housing when the second shifting element B is closed. The ring gear HO3 of the third planetary gearset RS3 is connected to the fourth shifting element D by the fifth shaft V. The sixth shaft VI connects the ring gear HO1 of the first planetary gearset RS1 to the planetary carrier PT2 of the second planetary gearset RS2 and to the planetary carrier PT4 of the fourth planetary gearset RS4. The seventh shaft VII connects the sun gear SO1 of the first planetary gearset RS1 to the sun gear SO3 of the third planetary gearset RS3 and to the fifth shifting element E. Finally, the ninth shaft I connects the sixth shifting element F to the sun gear SO2 of the second planetary gearset RS2 and to the third shifting element C.

In the fifth embodiment variant according to FIG. 6, to be specific, the first shaft I which is the drive input shaft An of the transmission is connected to the planetary carrier PT1 of the first planetary gearset RS1 and to the third shifting element C. The second shaft II, which is the drive output shaft Ab of the transmission, connects the planetary carrier PT3 of the third planetary gearset RS3 to the ring gear HO4 of the fourth planetary gearset RS4. The third shaft III connects the ring gear HO2 of the second planetary gearset RS2 to the housing when the first shifting element A is closed. By way of the fourth shaft IV the sun gear SO4 of the fourth planetary gearset RS4 can be connected to the housing G by means of the second shifting element B. By means of the fifth shaft V the ring gear HO3 of the third planetary gearset RS3 is connected to the fifth shifting element E and to the sixth shifting element F. The sixth shaft VI connects the ring gear HO1 of the first planetary gearset RS1 to the planetary carrier PT2 of the second planetary gearset RS2 and also to the planetary carrier PT4 of the fourth planetary gearset RS4. By the seventh shaft VII the sun gear SO1 of the first planetary gearset RS1 is connected to the fourth shifting element D and to the fifth shifting element E, while the eighth shaft VIII connects the sun gear SO3 of the third planetary gearset RS3 to the fourth shifting element D. Finally, the ninth shaft IX connects the sixth shifting element F to the sun gear SO2 of the second planetary gearset RS2 and to the third shifting element C.

In the shifting scheme shown in FIG. 2, the shifting elements A, B, C, D, E, F to be closed or activated in order to produce the various gears are represented in the form of a table, and for each gear a transmission ratio i and the respective gear intervals $\phi$ between various gears are indicated. Besides the nine forward gears 1, 2, 3, 4, 5, 6, 7, 8, 9 and the one reverse gear R indicated, four additional or alternative gears for the planetary transmission are shown, these being denoted by M. Preferably, the first two gears denoted by M are used as alternative fourth forward gears and the last two gears denoted by M are used as alternative first forward gears.

As the preferred fixed transmission ratio, for the first planetary gearset RS1 a value of approximately $i_0=-1.600$ can be used, for the second planetary gearset RS2 a value of around $i_0=-1.500$, for the third planetary gearset RS3 a value of around $i_0=-3.200$ and for the fourth planetary gearset RS4 a value of around $i_0=2.200$ can be used.

The various embodiment variants of the planetary transmission claimed according to the invention are characterized by particularly little structural complexity, low production costs and low weight. Furthermore, the proposed shifting scheme provides a harmonious series of transmission ratios with low absolute and relative rotation speeds and low planetary gearset and shifting element torques. Moreover, thanks to the connections chosen between the various elements of the proposed planetary transmission the gearing efficiencies are substantially optimized. In addition, since for each gear at least four disk shifting elements are closed, drag losses are low.

INDEXES

1 First forward gear
2 Second forward gear
3 Third forward gear
4 Fourth forward gear
5 Fifth forward gear
6 Sixth forward gear
7 Seventh forward gear
8 Eighth forward gear
9 Ninth forward gear
R Reverse gear
M Alternative or additional gears
G Housing
RS1 First planetary gearset
PT1 Planetary carrier of the first planetary gearset
HO1 Ring gear of the first planetary gearset
SO1 Sun gear of the first planetary gearset
RS2 Second planetary gearset
PT2 Planetary carrier of the second planetary gearset
HO2 Ring gear of the second planetary gearset
SO2 Sun gear of the second planetary gearset
RS3 Third planetary gearset
PT3 Planetary carrier of the third planetary gearset
HO3 Ring gear of the third planetary gearset
SO3 Sun gear of the third planetary gearset
RS4 Fourth planetary gearset
PT4 Planetary carrier of the fourth planetary gearset
HO4 Ring gear of the forth planetary gearset
SO4 Sun gear of the fourth planetary gearset
PRI4 Inner planetary gearwheels of the fourth planetary gearset
PRA4 Outer planetary gearwheels of the fourth planetary gearset
I First shaft
II Second shaft
III Third shaft
IV Fourth shaft
V Fifth shaft
VI Sixth shaft
VII Seventh shaft
VIII Eighth shaft
IX Ninth shaft
An Drive input
Ab Drive output
A First shifting element
B Second shifting element
C Third shifting element
D Fourth shifting element
E Fifth shifting element
F Sixth shifting element

The invention claimed is:

1. A multi-gear planetary transmission for a vehicle, the transmission comprising:

first, second, third and fourth planetary gearsets (RS1, RS2, RS3, RS4), and each of the first, the second, the third and the fourth planetary gearsets comprising a sun gear, a ring gear and a planetary carrier;

a plurality of shafts (I, II III, IV, V, VI, VII VIII, IX);

first, second, third, fourth, fifth, and sixth shifting elements (A, B, C, D, E, F), and selective actuation of the first, the second, the third, the fourth, the fifth and the sixth shifting elements implementing a plurality of gear steps;

at least the fourth planetary gearset (RS4) is a plus planetary gearset, a first shaft (I), of the plurality of shafts, being a drive input (An), and the first shaft (I) being directly connected to the planetary carrier (PT1) of the first planetary gearset (RS1) and directly connected to the third shifting element (C), and the third shifting element (C), when engaged, directly connects the drive input (An) with the sun gear of the second planetary gearset (RS4);

a second shaft (II), of the plurality of shafts, being a drive output (Ab), and the second shaft (II) being directly connected at least to the ring gear (HO) of the fourth planetary gearset (RS4), and the drive output (Ab) being one directly connected with the planet carrier of the third planetary gearset (RS3) or directly connected with the planet carrier of the third planetary gearset (RS3) by engagement of the fourth shift element (D); and each of the gear steps of the multi-gear planetary transmission being implemented by selective engagement of only four of the first, the second, the third, the fourth, the fifth and the sixth shifting elements (A, B, C, D, E, F).

2. The planetary transmission according to claim 1, wherein
the drive input (An) is connected to the planetary carrier (PT1) of the first planetary gearset (RS1) and to the third shifting element (C), and the first planetary gearset (RS1) is a minus planetary gearset;
is the drive output (Ab) which is connected to the planetary carrier (PT3) of the third planetary gearset (RS3) and to the ring gear (HO4) of the fourth planetary gearset (RS4), and the third planetary gearset (RS3) is a minus planetary gearset;
a third shaft (III), of the plurality of shafts, is connected to the ring gear (HO2) of the second planetary gearset (RS2), the third shaft (III) is connectable, via the first shifting element (A), to a housing, and the second planetary gearset (RS2) is a minus planetary gearset;
a fourth shaft (IV), of the plurality of shafts, is connected to the sun gear (SO4) of the fourth planetary gearset (RS4), and the fourth shaft (IV) is connectable, via the second shifting element (B), to the housing;
a fifth shaft (V), of the plurality of shafts, is connected to both the ring gear (HO3) of the third planetary gearset (RS3) and the fourth shifting element (D);
a sixth shaft (VI), of the plurality of shafts, is connected to the ring gear (HO1) of the first planetary gearset (RS1), and the sixth shaft (VI) is also connected to the planetary carrier (PT2) of the second planetary gearset (RS2) and the planetary carrier (PT4) of the fourth planetary gearset (RS4);
a seventh shaft (VII), of the plurality of shafts, is connected to both the sun gear (SO1) of the first planetary gearset (RS1) and the sun gear (SO3) of the third planetary gearset (RS3), and the seventh shaft (VII) is also connected to the fifth shifting element (E); and
an eighth shaft (IX), of the plurality of shafts, is connected to the sun gear (SO2) of the second planetary gearset (RS2), and the eighth shaft (IX) is also connected to both the sixth shifting element (F) and the third shifting element (C).

3. The planetary transmission according to claim 1, wherein
the drive input (An) which is connected to both the planetary carrier (PT1) of the first planetary gearset (RS1) and the third shifting element (C), and the first planetary gearset (RS1) is a minus planetary gearset;
the drive output (Ab) which is directly connected to both the planetary carrier (PT3) of the third planetary gearset (RS3) and the ring gear (HO4) of the fourth planetary gearset (RS4), and the third planetary gearset (RS3) is a minus planetary gearset;
a third shaft (Ill), of the plurality of shafts, is connected to the ring gear (HO2) of the second planetary gearset (RS2) and the third shaft (Ill) is connectable, via the first shifting element (A), to a housing, and the second planetary gearset (RS2) is a minus planetary gearset;
a fourth shaft (IV), of the plurality of shafts, is connected to the sun gear (SO4) of the fourth planetary gearset (RS4) and the fourth shaft (IV) is connectable, via the second shifting element (B), to the housing;

a fifth shaft (V), of the plurality of shafts, is connected to the ring gear (HO3) of the third planetary gearset (RS3) and the fifth shaft (V) is also connected to the fifth shifting element (E) and the sixth shifting element (F),
a sixth shaft (VI), of the plurality of shafts, is directly connected to the ring gear (HO1) of the first planetary gearset (RS1) and the sixth shaft (VI) is also directly connected to both the planetary carrier (PT2) of the second planetary gearset (RS2) and the planetary carrier (PT4) of the fourth planetary gearset (RS4);
a seventh shaft (VII), of the plurality of shafts, is connected to the sun gear (SO1) of the first planetary gearset (RS1) and the seventh shaft (VII) is also connected to the fourth shifting element (D) and the fifth shifting element (E);
an eighth shaft (VIII), of the plurality of shafts, is connected to both the sun gear (SO3) of the third planetary gearset (RS3) and the fourth shifting element (D); and
a ninth shaft (IX), of the plurality of shafts, is connected to the sun gear (SO2) of the second planetary gearset (RS2) and the ninth shaft (IX) is also connected to both the sixth shifting element (F) and the third shifting element (C).

4. The planetary transmission according to claim 1, wherein the first and the second shifting elements (A, B) are brakes, and the third, the fourth, the fifth, and the sixth shifting elements (C, 0, E, F) are clutches.

5. The planetary transmission according to claim 4, wherein the second shifting element (B) and the sixth shifting element (F) are interlocking or frictional shifting elements and the first, the third, the fourth and the fifth shifting elements (A, C, D, E) are frictional shifting elements.

6. The planetary gearset according to claim 1, wherein
the drive input (An) which is connected to both the planetary carrier (PT1) of the first planetary gearset (RS1) and to the third shifting element (C), and the first planetary gearset (RS1) is a minus planetary gearset;
the drive output (Ab) which is directly connected to both the fourth shifting element (D) and the ring gear (HO4) of the fourth planetary gearset (RS4);
a third shaft (III), of the plurality of shafts, is connected to the ring gear (HO2) of the second planetary gearset (RS2) and to the first shifting element (A) for coupling the third shaft to a housing, and the second planetary gearset (RS2) is a minus planetary gearset;
a fourth shaft (IV), of the plurality of shafts, is connected to both the sun gear (SO4) of the fourth planetary gearset (RS4) and the second shifting element (B), and the second shifting element (B) facilitates coupling of the fourth shaft to the housing;
a fifth shaft (V), of the plurality of shafts, is connected to the ring gear (HO3) of the third planetary gearset (RS3) and also coupled to at least one of the fifth shifting element (E) and the sixth shifting element (F), and the third planetary gearset (RS3) is a minus planetary gearset;
a sixth shaft (VI), of the plurality of shafts, is connected to the ring gear (HO1) of the first planetary gearset (RS1), and the sixth shaft (VI) is also connected to the planetary carrier (PT2) of the second planetary gearset (RS2) and the planetary carrier (PT4) of the fourth planetary gearset (RS4);
a seventh shaft (VII), of the plurality of shafts, is connected to the sun gear (SO1) of the first planetary gearset (RS1)

and also connected to at least one of the sun gear (SO3) of the third planetary gearset (RS3) and the fifth shifting element (E);

an eighth shaft (VIII), of the plurality of shafts, is connected to the planetary carrier (PT3) of the third planetary gearset (RS3) and to the fourth shifting element (D); and a ninth shaft (IX), of the plurality of shafts, is connected to the sixth shifting element (F), and the ninth shaft (IX) is also connected to the sun gear (SO2) of the second planetary gearset (RS2) and the third shifting element (C).

7. The planetary transmission according to claim 6, wherein the ring gear (HO3) of the third planetary gearset (RS3) is connectable, via the fifth shaft (V) and the fifth shifting element (E), to the sun gear (SO3) of the third planetary gearset (RS3) for blocking the third planetary gearset (RS3).

8. The planetary transmission according to claim 6, wherein the planetary carrier (PT3) of the third planetary gearset (RS3) is connectable, via the fifth shifting element (E) and the seventh shaft (VII), to the sun gear (SO3) of the third planetary gearset (RS3) for blocking the third planetary gearset (RS3).

9. The planetary gearset according to claim 6, wherein the planetary carrier (PT3) of the third planetary gearset (RS3) is connectable, via the eighth shaft (VIII), the fifth shifting element (E) and the fifth shaft (V), to the ring gear (HO3) of the third planetary gearset (RS3) for blocking the third planetary gearset (RS3).

10. The planetary transmission according to claim 6, wherein the planet carrier of the fourth planetary gearset (RS4) is directly connected to both the planet carrier of the second planetary gear gearset (RS2) and the ring gear of the first planetary gear set (RS1).

11. A multi-gear planetary transmission for a vehicle, the transmission comprising:

first, second, third and fourth planetary gearsets (RS1, RS2, RS3, RS4), at least the fourth planetary gearset (RS4) being a plus planetary gearset, and each of the first, the second, the third and the fourth planetary gearsets comprising a sun gear, a ring gear and a planetary carrier;

first, second, third, fourth, fifth, sixth, seventh, eighth and ninth shafts (I, II III, IV, V, VI, VII VIII, IX);

first, second, third, fourth, fifth and sixth shifting elements (A, B, C, D, E, F) which are actuatable for implementing a plurality of gear steps, and each of the plurality of gear steps of the multi-gear planetary transmission being implemented by selective engagement of only four of the first, the second, the third, the fourth, the fifth and the sixth shifting elements;

the first shaft (I) being a drive input (An) which being directly connected to the planetary carrier (PT1) of the first planetary gearset (RS1) and the first shaft (I) also is directly connected to the third shifting element (C), and the third shifting element (C), when engaged, directly connects the drive input (An) with the sun gear of the second planetary gearset (RS4); and the second shaft (II) being a drive output (Ab) which is directly connected to at least to the ring gear (HO) of the fourth planetary gearset (RS4), and the drive output (Ab) being one directly connected with the planet carrier of the third planetary gearset (RS3) or directly connected with the planet carrier of the third planetary gearset (RS3) by engagement of the fourth shift element (D).

12. The planetary transmission according to claim 11, wherein the planet carrier of the fourth planetary gearset (RS4) is directly connected to both the planet carrier of the second planetary gear gearset (RS2) and the ring gear of the first planetary gear set (RS1).

13. A multi-gear planetary transmission for a vehicle, the transmission comprising:

first, second, third and fourth planetary gearsets (RS1, RS2, RS3, RS4), and each of the first, the second, the third and the fourth planetary gearsets comprising a sun gear, a ring gear and a planetary carrier;

a plurality of shafts (I, II III, IV, V, VI, VII VIII, IX);

first, second, third, fourth, fifth, and sixth shifting elements (A, B, C, D, E, F), and selective actuation of the first, the second, the third, the fourth, the fifth and the sixth shifting elements implementing a plurality of gear steps;

at least the fourth planetary gearset (RS4) is a plus planetary gearset;

a first shaft (I), of the plurality of shafts, being a drive input (An), and the first shaft (I) being directly connected to the planetary carrier (PT1) of the first planetary gearset (RS1) and directly connected to the third shifting element (C), and the third shifting element (C), when engaged, directly connects the drive input (An) with the sun gear of the second planetary gearset (RS4);

a second shaft (II), of the plurality of shafts, being a drive output (Ab), and the second shaft (II) being directly connected at least to the ring gear (HO) of the fourth planetary gearset (RS4), and the drive output (Ab) being one directly connected with the planet carrier of the third planetary gearset (RS3) or directly connected with the planet carrier of the third planetary gearset (RS3) by engagement of the fourth shift element (D);

a third shaft (III), of the plurality of shafts, being directly connected to the ring gear (HO2) of the second planetary gearset (RS2) and the third shaft Op is connectable, via the first shifting element (A), to a housing; and each of the gear steps of the multi-gear planetary transmission being implemented by selective engagement of only four of the first, the second, the third, the fourth, the fifth and the sixth shifting elements (A, B, C, D, E, F).

14. The planetary transmission according to claim 13, wherein the planet carrier of the fourth planetary gearset (RS4) is directly connected to the planet carrier of the second planetary gear gearset (RS2) and the planet carrier of the second planetary gear gearset (RS2) is also directly connected to the ring gear of the first planetary gear set (RS1).

* * * * *